O. WIEDEMANN.
MANUFACTURE OF WALL COVERINGS.
APPLICATION FILED MAR. 13, 1914.
1,129,933.
Patented Mar. 2, 1915.
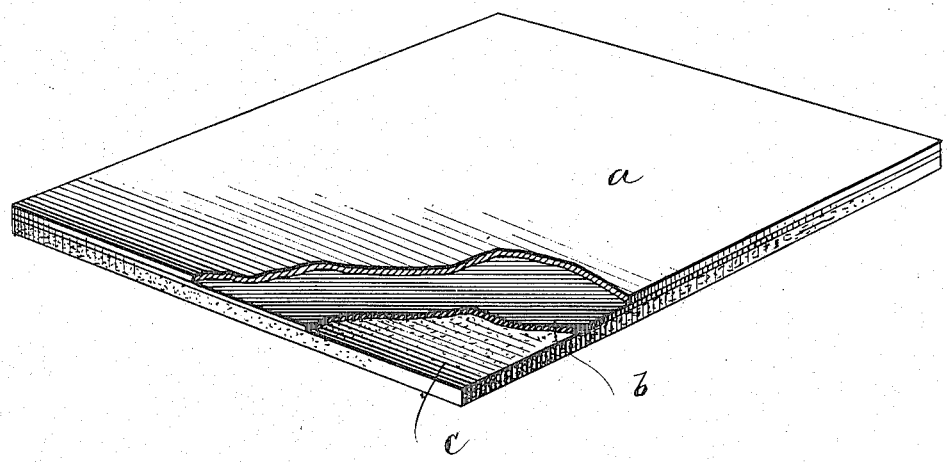
WITNESSES:
INVENTOR
Otto Wiedemann
BY
ATTORNEYS.

UNITED STATES PATENT OFFICE.

OTTO WIEDEMANN, OF DEMMIN, GERMANY.

MANUFACTURE OF WALL-COVERINGS.

1,129,933.  Specification of Letters Patent.  Patented Mar. 2, 1915.

Application filed March 13, 1914. Serial No. 824,396.

*To all whom it may concern:*

Be it known that I, OTTO WIEDEMANN, a subject of the King of Prussia, residing at Demmin, Prussia, Germany, have invented certain new and useful Improvements in or Pertaining to the Manufacture of Wall-Coverings, of which this is a specification.

This invention relates to the manufacture of wall-coverings, and it has for its object the production of a covering material having a wooden surface, but in other respects resembling wall-paper, inasmuch as it is quite flexible and can be attached as easily to a curved as to a straight surface of wood, cement, mortar, or other material. The flexibility of the wall-covering produced enables certain parts and details which hitherto have had to be made in solid wood to be made of a cheaper material and then covered with such a covering.

An important advantage of the wall-covering in accordance with the present invention consists in the fact that it can be polished while laid flat, and can then, if desired, be attached to a curved surface.

The accompanying drawing represents a perspective view, partly broken away of a wall covering made according to my invention.

Covering material consisting of a hardwood veneer attached to a soft flexible backing, such as linoleum or the like, has already been proposed; but the method employed in its manufacture has been such as to cause the adhesive material employed to penetrate the veneer, rendering it brittle and impairing its flexibility.

Now the present invention has for its object to obviate this defect, and according thereto, in order as far as possible to prevent the adhesive medium *b* from penetrating into the veneer *a* of oak, mahogany, maple or other hardwood and rendering it brittle, so that it cracks or flaws when bent, the hardwood veneer is allowed to remain cool, or it may be, artificially cooled during its attachment to the soft backing, while the backing *c* itself is at the same time artificially heated.

It has heretofore been usual, in the production of material consisting of several layers of wood glued together to facilitate the joining process by heating, but in all the methods heretofore proposed for this purpose both sides of the material to be joined together have been subjected to heat. In accordance with the method to which this invention relates, however, only one side is subjected to heat, this side being the soft backing; with the result that the adhesive medium sets so rapidly that it fails to penetrate the hardwood veneer, and remains on its rear surface which is to be joined to the soft backing, while it notwithstanding readily penetrates the heated backing and unites it in an absolutely satisfactory manner to the hardened veneer. The resulting covering as previously stated may be attached to a wall or other surface of any degree of curvature.

It is always advantageous to carry out the various operations, such as polishing, deadening and the like, to which the wall-covering may be subjected while this covering is laid flat, and before it is attached to the curved surface to be covered by it, as by this means these operations can be carried out in a more satisfactory manner.

What I claim is:—

1. The method for the manufacture of a wall-covering which consists in inserting between a sheet of wooden veneer and a sheet of flexible material, a layer of a cementitious substance adapted to be rendered adhesive by heating, and heating the exposed or rear surface of the flexible sheet.

2. The method for the manufacture of a wall-covering which consists in inserting between a sheet of wooden veneer and a sheet of flexible material, a layer of a cementitious substance adapted to be rendered adhesive by heating, heating the exposed or rear surface of the flexible sheet, and cooling the front or exposed surface of the veneer.

3. The method for the manufacture of a wall-covering which consists in inserting glue between a sheet of veneer and a sheet of linoleum, and heating the rear surface of the linoleum sheet.

4. The method for the manufacture of a wall-covering which consists in inserting glue between a sheet of veneer and a sheet of linoleum, heating the rear surface of the linoleum sheet and cooling the front or exposed surface of the veneer.

5. The method for the manufacture of a wall-covering which consists in inserting between a sheet of wooden veneer and a sheet of flexible material, a layer of a cementitious substance adapted to be rendered adhesive by heating, heating the exposed or rear surface of the flexible sheet and roughening this surface.

6. The method for the manufacture of a wall-covering which consists in inserting between a sheet of wooden veneer and a sheet of flexible material, a layer of a cementitious substance adapted to be rendered adhesive by heating, heating the exposed or rear surface of the flexible sheet, cooling the front or exposed surface of the veneer; and roughening the rear surface of flexible material.

7. The method for the manufacture of a wall-covering which consists in inserting glue between a sheet of veneer and a sheet of linoleum, heating the rear surface of the linoleum sheet and roughening this surface.

8. The method for the manufacture of a wall-covering which consists in inserting glue between a sheet of veneer and a sheet of linoleum, heating the rear surface of the linoleum sheet, cooling the front or exposed surface of the veneer and roughening the rear surface of the linoleum.

In testimony whereof I have hereunto affixed my signature in the presence of two witnesses.

Munich, this 26 day of February 1914.

OTTO WIEDEMANN.

Witnesses:
  A. McCoy,
  Arthur Gube.